(12) United States Patent
Nabetani et al.

(10) Patent No.: US 7,383,831 B2
(45) Date of Patent: Jun. 10, 2008

(54) COMBUSTION ENGINE CHAMBER

(75) Inventors: Shigeki Nabetani, Okazaki (JP);
Tomoharu Sakai, Okazaki (JP);
Yoshihiko Tanimura, Kyoto (JP);
Hiroshi Yanagisawa, Anjyo (JP)

(73) Assignee: Mitsubishi Jidosha Kogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 11/346,168

(22) Filed: Feb. 3, 2006

(65) Prior Publication Data

US 2006/0185642 A1  Aug. 24, 2006

(30) Foreign Application Priority Data

Feb. 18, 2005 (JP) .............................. 2005-042739

(51) Int. Cl.
*F02B 23/00* (2006.01)
*F02F 3/00* (2006.01)
*F02F 3/28* (2006.01)

(52) U.S. Cl. ...................... 123/661; 123/667; 123/193.6

(58) Field of Classification Search ................ 123/661, 123/667, 671, 193.6, 279, 262, 263, 269, 123/307

See application file for complete search history.

(56) References Cited

U.S. PATENT DOCUMENTS

| | | | |
|---|---|---|---|
| 4,162,661 A | | 7/1979 | Nakanishi et al. |
| 4,291,662 A | * | 9/1981 | Nakamura et al. ........... 123/661 |
| 5,771,872 A | * | 6/1998 | Ueda et al. ................... 123/661 |
| 5,816,229 A | * | 10/1998 | Roderweiss et al. .......... 123/671 |
| 5,819,700 A | * | 10/1998 | Ueda et al. ................... 123/262 |
| 6,336,438 B1 | | 1/2002 | Durnholz et al. |
| 6,494,178 B1 | * | 12/2002 | Cleary et al. ................. 123/276 |
| 6,557,514 B1 | * | 5/2003 | Gaiser ...................... 123/193.6 |
| 6,874,489 B2 | * | 4/2005 | Yonekawa et al. ........... 123/661 |
| 6,971,379 B2 | * | 12/2005 | Sakai et al. .................. 123/661 |
| 2004/0123855 A1 | * | 7/2004 | Yonekawa et al. ........... 123/661 |
| 2006/0137666 A1 | * | 6/2006 | Kitada et al. ................ 123/661 |

FOREIGN PATENT DOCUMENTS

| | | | |
|---|---|---|---|
| DE | 19827463 | | 12/1999 |
| DE | 19909112 | | 3/2000 |
| EP | 1081350 | | 3/2001 |
| JP | 4-91315 | * | 8/1990 |
| JP | 7-36107 | Y2 | 8/1995 |

\* cited by examiner

*Primary Examiner*—Stephen K. Cronin
*Assistant Examiner*—Ka Chun Leung
(74) *Attorney, Agent, or Firm*—Birch, Stewart, Kolasch & Birch, LLP

(57) ABSTRACT

A structure of a chamber in a combustion engine includes a ring-groove portion formed on the piston, a squish-area making portion formed on a top surface of the piston for a squish-area, an outer edge portion formed around the top surface excepting the squish-area making portion, and a land portion formed around a side surface between the ring-groove portion and the top surface. The land portion includes, a squish-land portion formed between the ring-groove portion and the squish-area making portion, an outer-edge-land portion formed between the ring-groove portion and said outer edge portion, the outer-land portion being smaller than the squish-land portion in height.

3 Claims, 10 Drawing Sheets

PRIOR ART

COMBUSTION ENGINE CHAMBER

CROSS-REFERENCE TO THE RELATED APPLICATION

This application incorporates by references the subject matter of Application No. 2005-042739 filed in Japan on Feb. 18, 2005 on which a priority claim is based under 35 U.S.C. §119(a).

BACKGROUND OF THE INVENTION (1) Field of the Invention

The present invention relates to a structure of a chamber for a combustion engine.

(2) Description of Related Art

As shown in FIG. 9, conventional internal combustion engine 200 includes a cylinder head 203, a piston 201 and a chamber 205 which is formed from a bottom surface 204 of cylinder head 203 and a top surface 202 of the piston 201.

In the engine 200, squish areas 206 and 207, which are narrow spaces formed between the piston top surface 202 and a bottom edge 205A of the chamber 205, are made when the piston 201 is in Top Dead Center (TDC).

Accordingly, in the engine 200, it is possible to generate squish currents (see arrow "SF" in FIG. 9), which are air currents individually spurted out from the squish spaces 206 and 207 to the center of chamber 205 when the piston 201 comes up from Bottom Dead Center (BDC) to TDC. Further, in FIG. 9, each of 'h206' and 'h207' indicates the height of squish spaces 206, 207, respectively.

Besides, as shown in FIG. 10, a valve recess 210 is formed on the top surface 202 of the piston 201 so that intake valves and exhaust valves (not shown in FIGS. 9 and 10) do not hit against the top surface 202 partly because a Variable Valve Timing (VVT) mechanism (not shown in FIGS. 9 and 10) is equipped with the engine 200.

In other words, a valve stroke of the intake and/or the exhaust valve in an engine having the VVT mechanism is longer when the piston 201 is at TDC as compared to an engine without the mechanism. Accordingly the valve recess 210 is formed on the piston top surface 202 to avoid the valves hitting against the piston 201.

For example, a laid-open publication Japanese Utility Model (Kokoku) HEI 7-36107 discloses techniques related with the valve recess.

However, as shown in FIG. 10, it is necessary to move a top ring groove 208B, down (toward a piston pin 211 shown in FIG. 9) in which a piston ring (top ring) is fitted, when a valve recess is formed as deeply as the valve recess 210 shown in FIG. 10 because it is necessary to keep a thickness between the valve recess 210 and the top ring groove 208B as indicated 'h205' in FIG. 10.

Accordingly, it is impossible to avoid increasing the height of a top and 209, which is formed around the side surface of the piston 201 and is formed between the top ring groove 208B and the top surface 202, to keep necessary distance between the top ring groove 208B and the top surface 202.

In FIG. 10, an imaginary top ring groove 208A, formed when the valve recess 210 is not formed on the top surface 202, is shown by a dashed line.

Further, 'h209A' shows the height of the top land 209 when the valve recess 210 is not formed on the top surface 202. Alternatively, 'h209B' shows the height of the top land 209 when the valve recess 210 is formed on the top surface 202.

In other words, FIG. 10 shows that it is impossible to avoid increasing the top land's height due to forming the valve recess 210 by comparing between the height h209A and h209B.

However, increasing the volume of a quenching area which is a space between the top land 209 and a cylinder liner (not shown in FIGS. 9 and 10) is inevitable, if the height of the top land 209 is increased. Namely, flames from combustion in the chamber 205 cannot spread into the quenching area, and thus quality of the exhaust gas emitted from the engine 200 gets worse due to increasing amounts of HC (Hydro Carbons as unburned fuel).

In order to avoid worsening of the quality of exhaust gas, the location of the top surface 202 may be lowered toward the piston pin 211, i.e., the height h211 between the top surface 202 and the center $C_{201}$ of the piston pin 211 is reduced.

But, it is also inevitable to increase the heights h206 and h207 of the squish areas 206 and 207. Accordingly, the fuel consumption becomes bad due to difficulties in generating adequate squish currents SF.

SUMMARY OF THE INVENTION

The present invention has been developed in consideration of this situation, and provides a structure of a chamber for a combustion engine which is capable of improving both fuel consumption and quality of exhaust gas quality.

For this purpose, in accordance with an aspect of the present invention, there is provided a structure of a chamber in a combustion engine comprising: a cylinder block of an engine having a cylinder in which a piston is reciprocatably disposed; a cylinder head of the engine disposed on the cylinder block; a chamber formed between a bottom surface of the cylinder head and a top surface of the piston; an intake port formed in the cylinder head for inducting air to the chamber; an exhaust port formed in the cylinder head for discharging exhaust gas from the chamber; an intake valve for selectably closing the intake port;

an exhaust valve for selectably closing the exhaust port; a ring-groove portion, in which a piston ring is fitted, formed around a side-outer surface of the piston; a squish-area making portion, which is formed on the top surface of the piston, for making narrow space as a squish-area defined between the bottom surface of the cylinder head and the top surface of the piston located in top dead center; and an outer edge portion formed around the top surface of the piston except the squish-area making portion; and a land portion, which is formed around a side surface of the piston between the ring-groove portion and the top surface of the piston, having a squish-land portion formed between the ring-groove portion and the squish-area making portion, and a outer edge land portion which is formed between the ring-groove portion and the outer edge portion and is smaller than the squish-land portion in height.

With this arrangement, improved fuel consumption and quality of exhaust gases emitted from the engine are both realized.

BRIEF DESCRIPTION OF THE DRAWINGS

The nature of this invention, as well as other objects and advantages thereof, will be explained in the following with reference to the accompanying drawings, in which like reference characters designate the same or similar parts throughout the figures and wherein.

DETAILED DESCRIPTION OF THE INVENTION

The first embodiment of the present invention will now be described with reference to the accompanying drawings.

Figure 1:
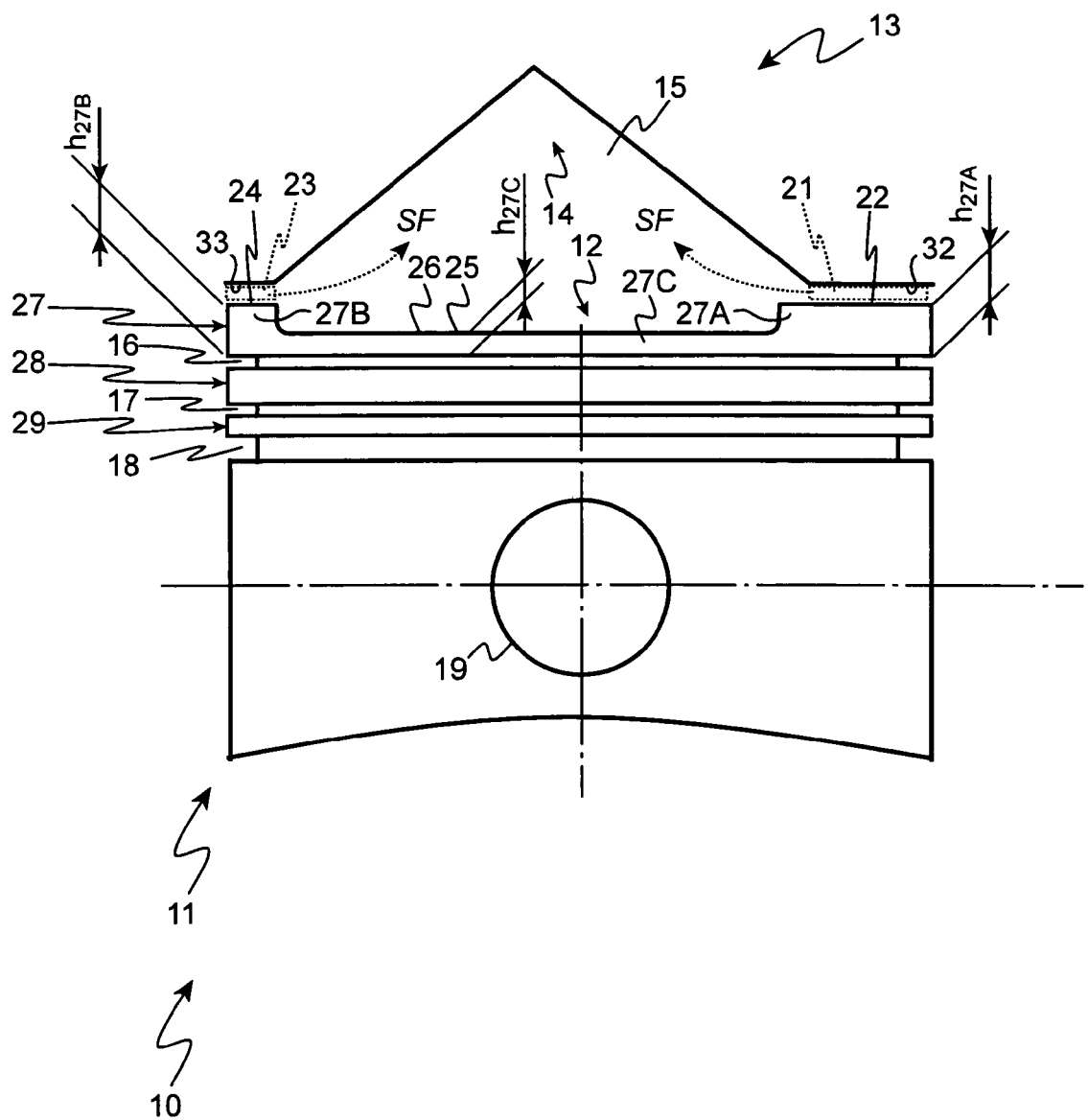
FIG. 1 is a side view showing a chamber and a piston according to a first embodiment of the present invention.

As shown in FIG. 1, a piston 11 in an engine 10 is reciprocated in a cylinder (not shown) formed in a cylinder block (not shown). A chamber 15 is formed between a bottom surface 14 of the cylinder head 13 and a top surface 12 of the piston 11.

Further, an intake port (not shown) and an exhaust port (not shown) are formed in the cylinder head 13 connected to the chamber 15. Intake valves (not shown) and exhaust valves (not shown) are equipped in the intake port and the exhaust port, respectively.

Additionally, a Variable Valve Timing (VVT) mechanism (not shown) is equipped with the engine 10 for individually adjusting the stroke and timing of the intake valves and the exhaust valves.

Around the side surface of the piston 11, a top ring groove (ring-groove portion) 16, a second ring groove 17 and a third ring groove 18 are formed. It is possible for the grooves 16, 17, 18 to have piston rings (not shown), individually residing therein.

The top ring groove 16 is formed near the piston top surface 12 while maintaining a necessary distance from a valve recess 31 which will be described later.

The second ring groove 17 is formed below the top ring groove 16, and the third ring groove 18 is formed below the second ring groove 17.

On the piston top surface 12, an intake squish-area making portion (squish-area making portion) 22, an exhaust squish-area making portion (squish-area making portion) 24, an outer edge portion 25 and a flat portion 26 are formed.

The intake squish-area making portion 22 is a portion which is swelled up toward the cylinder head 13 so that an intake squish-area 21 is made between the bottom surface 14 of the cylinder head 13 and the intake squish-area making portion 22 when the piston 11 is at Top Dead Center (TDC).

Likewise, the exhaust squish-area making portion 24 is a portion which is swelled up toward the cylinder head 13 so that an exhaust squish-area 23 is made between the bottom surface 14 of the cylinder head 13 and the exhaust squish-area making portion 23 when the piston 11 is at TDC.

The surface of intake squish-area making portion 22 is formed in a shape which is substantially parallel to an intake squish flat portion 32 (described below) formed on a bottom surface 14 of the cylinder head 13.

Likewise, the surface of exhaust squish-area making portion 24 is formed in a shape which is substantially parallel to an exhaust squish flat portion 33 (described below) formed on the bottom surface 14.

Figure 2:
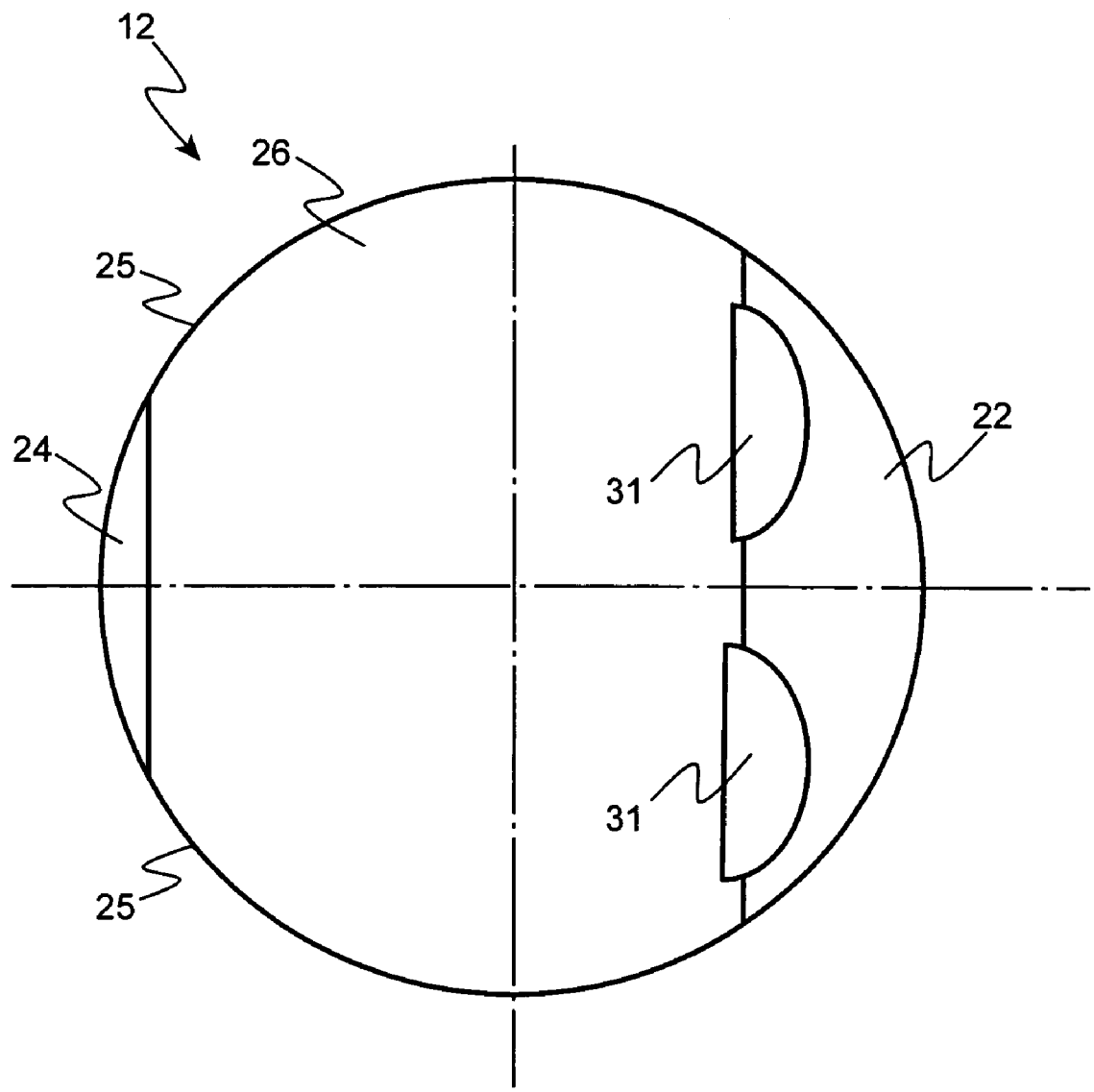
FIG. 2 is a plain view schematically showing a top surface of the piston according to the first embodiment of the present invention.

As shown in FIG. 2, the outer edge portion 25 is a flat portion that is formed around the outer edge of the top surface 12 that excludes the intake and exhaust squish-area making portions 22 and 24.

In addition, the flat portion 26 that is formed on the top surface 12, excepting the intake and exhaust squish-area making portions 22 and 24 and is the same as the outer edge portion 25 in height.

Further, as shown in FIG. 1, a top land (land portion) 27, a second land 28 and a third land 29 are formed around the side surface of the piston 11. The top land 27 is formed between the top surface 12 and the top ring groove 16, the second land 28 is formed between the top groove 16 and the second ring groove 17, and the third land 29 is formed between the second ring groove 17 and the third ring groove 18.

Additionally, the top land 27 has an intake squish-land portion 27A, an exhaust squish-land portion 27B and an outer edge land portion 27C.

Each of the intake and exhaust squish-land portions 27A and 27B is formed as a part of the top land 27 between the intake and exhaust squish-area making portions 22 and 24 and the top ring groove 16.

The outer edge land portion 27C is formed as a part of the top land 27 between the outer edge portion 25 and the top ring groove 16.

Further, the intake squish-land portion 27A, the exhaust squish-land portion 27B and the outer edge land portion 27C are formed so as to satisfy the following conditions #1 and #2.

h27A>h27C    (Condition #1)

h27B>h27C    (Condition #2)

h27A: Height of the intake squish-land portion 27A
h27B: Height of the exhaust squish-land portion 27B
h27C: Height of the outer edge land portion 27C As shown in FIG. 2, intake valve recesses (valve recesses) 31 are formed on the top surface 12 so that opened intake valves (not shown) are prevented from hitting against the top surface 12 when the piston 11 is at TDC.

Figure 3:
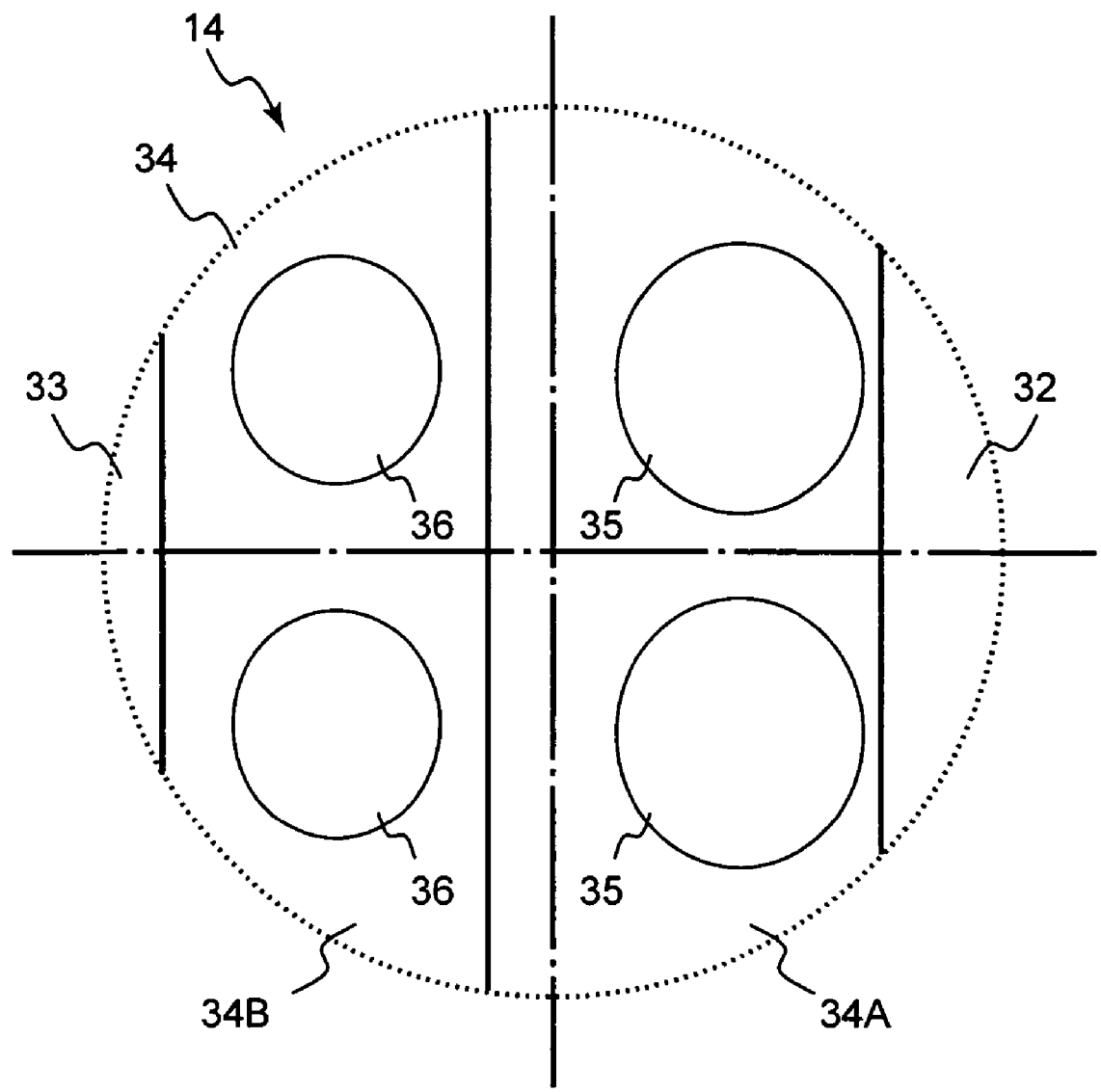
FIG. 3 is a plain view schematically showing an upper surface of the chamber according to the first embodiment of the present invention.

Additionally, as shown in FIG. 3, on the bottom surface 14 of the cylinder head 13, an intake squish flat portion 32, an exhaust squish flat portion 33 and a pent-roof portion 34 are formed.

As shown on the right side of FIG. 3, the intake squish flat portion 32 is flatly formed in parallel to the intake squish-area making portion 22 on the top surface 12. Also, as shown on the left side of FIG. 3, the exhaust squish flat portion 33 is flatly formed in parallel to the exhaust squish-area making portion 24.

The pent-roof portion 34 that is formed in a shape which is similar to a shallow peaked roof and has an intake slope portion 34A and an exhaust slope portion 34B. The intake slope portion 34A has intake openings 35 each openably covered with the intake valves (not shown). And the exhaust slope portion 34B has exhaust openings 36 each openably covered with the exhaust valves (not shown).

The operation and the effect of the present invention of the first embodiment will now be described as follows.

Figure 10:
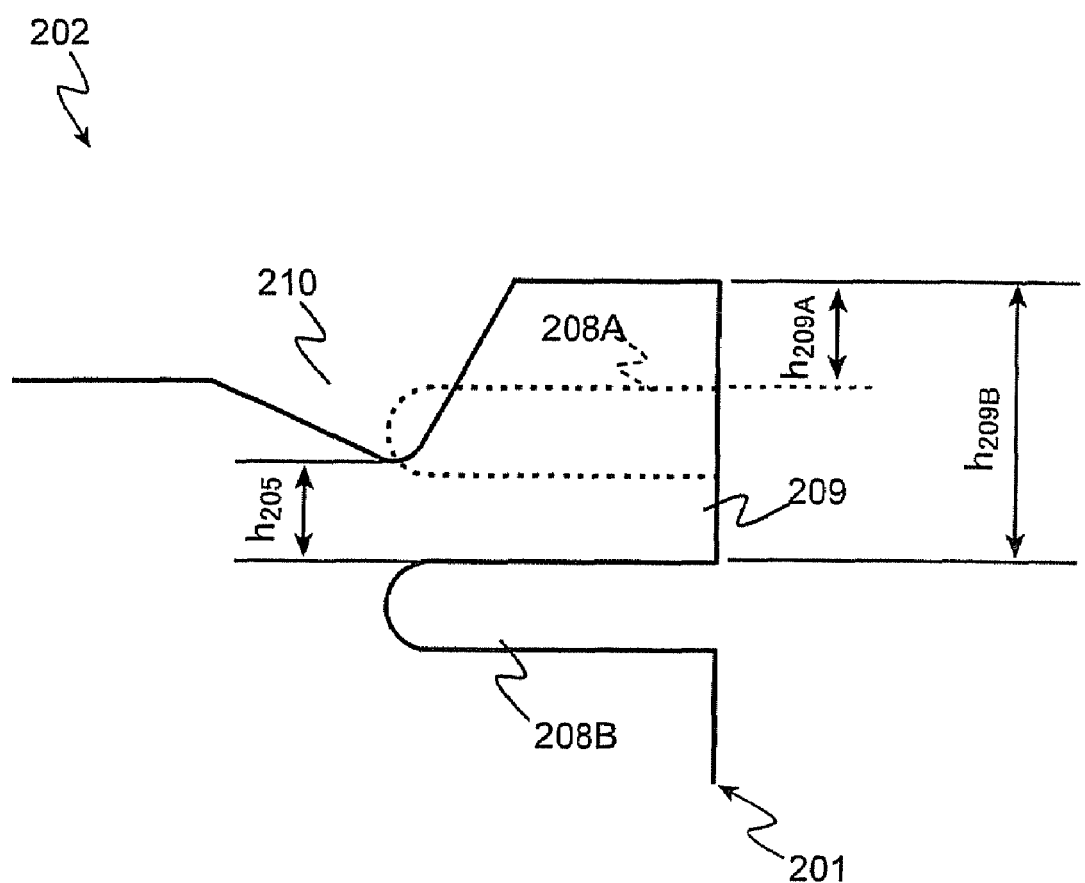
FIG. 10 is a cross-sectional view showing a top edge of a conventional piston.

As described above, it is easier to drastically reduce the height h27c of the outer edge land portion 27C of piston 11 than the height h209B of the conventional piston 201 as shown in FIG. 10. Accordingly, it is possible to reduce the quenching area, which is made between the outer edge land portion 27C and cylinder liner (not shown), in volume.

Further, when the piston 11 moves up near TDC, causes the intake squish-area making portion 22 and the intake squish flat portion 32 to become very close and, it gives rise to the intake squish-area 21 accordingly. Likewise, the exhaust squish flat portion 33 gives rise to the exhaust squish-area 23 as they become closer.

Further, generating the squish currents from both of the intake squish-area 21 and the exhaust squish-area 23 to the center of chamber 15 is realized (see arrows 'SF' in FIG. 1).

Namely, the first embodiment of the present invention can be provide the following effects or/and advantages. It is possible to reduce the amount of HC (Hydro Carbons as unburned fuel) in such a manner that surely reduces both the quenching area in volume and generating of the squish currents. Consequently, improved fuel consumption and quality of exhaust gases emitted from the engine 10 are both realized.

Additionally, it is possible to keep necessary rigidity by maintaining necessary metal thickness between the intake valve recesses 31 and the top ring groove 16 even if the intake valve recesses 31 are formed on the top surface 12.

Still additionally, it is possible to enable the intake valves to have longer strokes even when the piston 11 is at TDC since the intake valve recesses 31 are formed on the top surface 12. The power of engine 10 is thereby increased, since the efficiency of air-intake through the intake port the engine 10 is improved.

Further additionally, it is possible to guide the exhaust gases as EGR (Exhaust Gas Recirculation) gas into the intake port during the end period of the exhaust cycle (namely, at a time when the piston 11 is near TDC) since the engine 10 is equipped with the VVT mechanism. The amount of NOx (Nitrogen Oxide) contained in the exhaust gases is therefore reduced.

Moreover, it is also possible to improve productivity of the piston 11 because the flat portion 26 is formed on the top surface 12 which is same as the outer edge portion 25 in height.

Next a second embodiment of the present invention will now be described with reference to the accompanying drawings.

The same reference numbers of the present embodiment as the first embodiment designate the same elements of the first embodiment, and the present embodiment will now be described focusing on the differences from the first embodiment with reference to accompanying drawings also used for the first embodiment.

Figure 4:
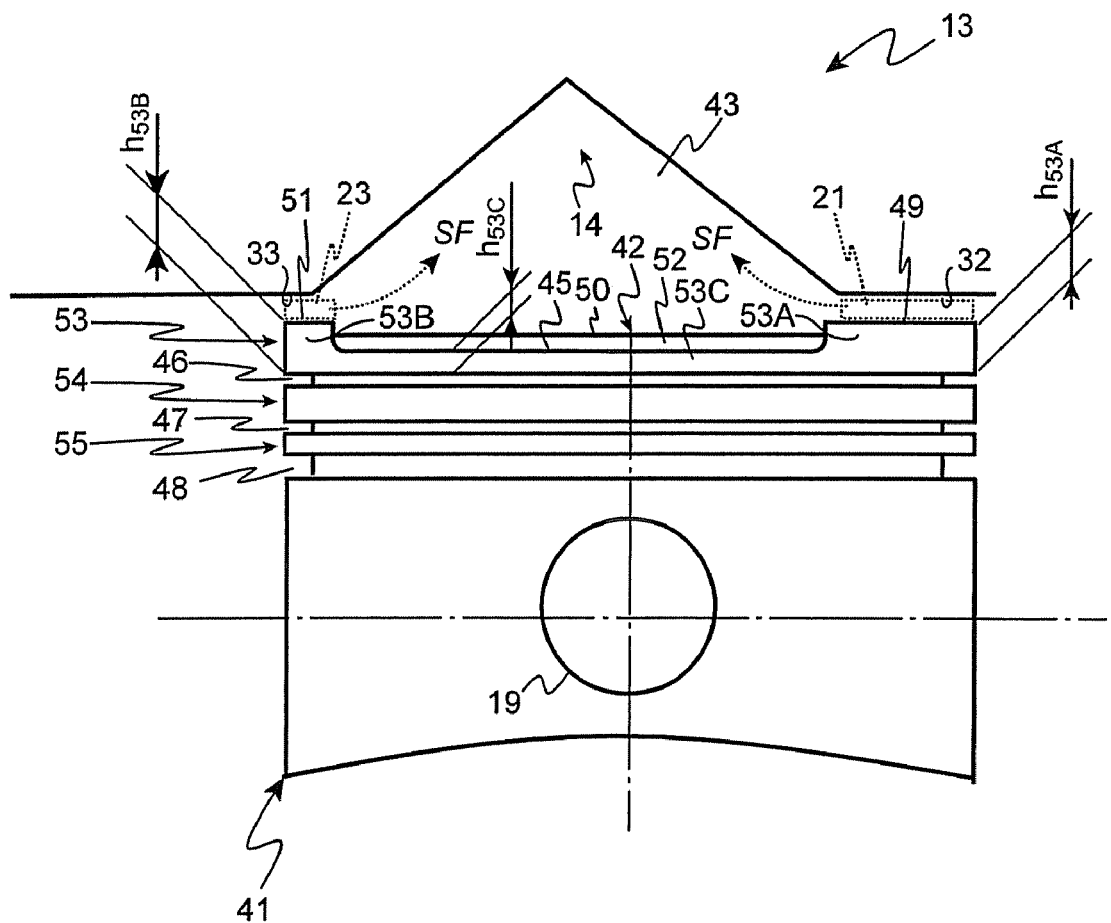
FIG. 4 is a side view showing a chamber and a piston according to a second embodiment of the present invention.

As shown in FIG. 4, a piston 41 in an engine 40 is reciprocated in a cylinder (not shown) formed in a cylinder block (not shown). And a chamber 43 is formed between the bottom surface 14 of the cylinder head 13 and a top surface 42 of the piston 41.

A top ring groove (ring groove) 46, a second ring groove 47 and a third ring groove 48 are formed around the side surface of the piston 41. It is possible for the grooves 46, 47 and 48 to have the piston rings (not shown), individually residing therein.

The top ring groove 46 is formed near the piston top surface 42 while maintaining a necessary distance from a valve recess 56 (described later).

The second ring groove 47 is formed below the top ring groove 46, and the third ring groove 48 is formed below the second ring groove 47.

Figure 5:
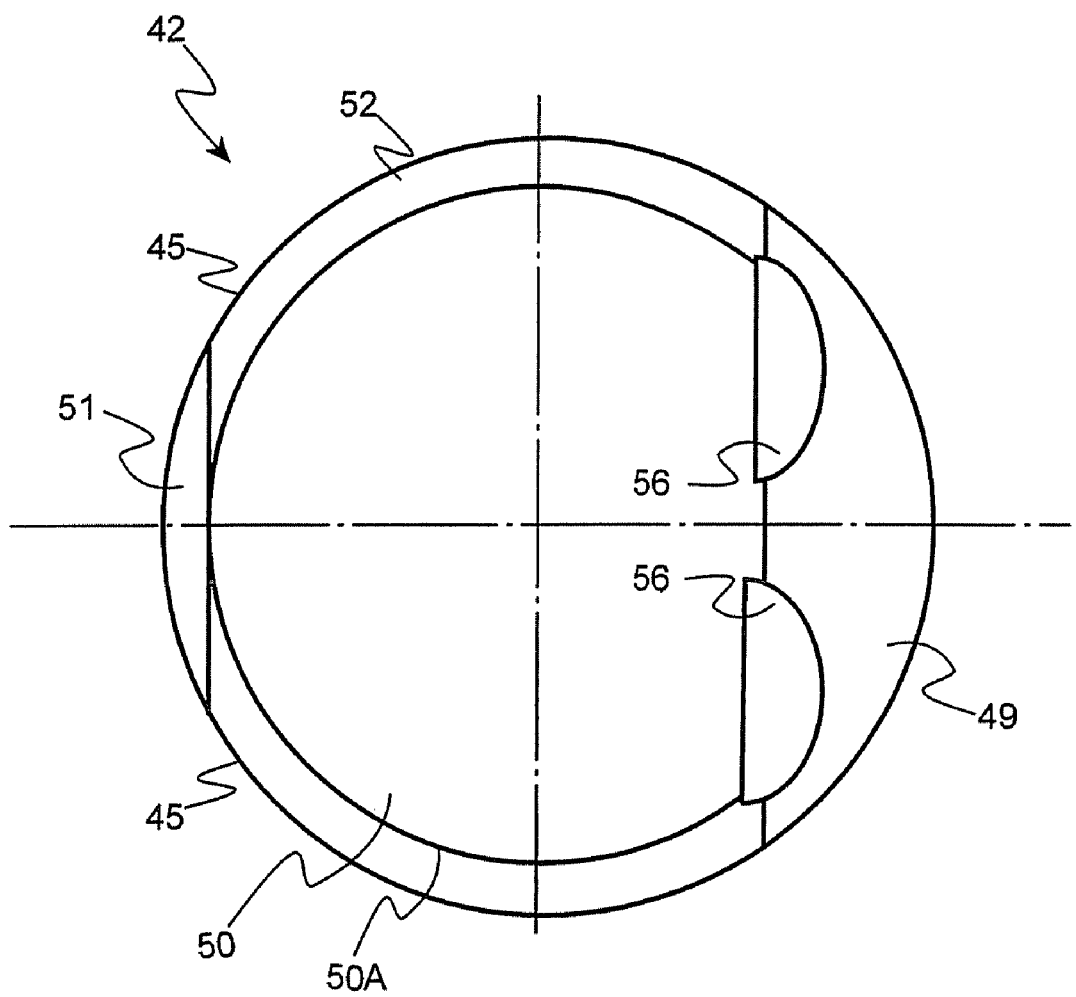
FIG. 5 is a plain view schematically showing a top surface of the piston according to the second embodiment of the present invention.

As shown in FIG. 5, on the piston top surface 42, an intake squish-area making portion (squish-area making portion) 49, an exhaust squish-area making portion (squish-area making portion) 51, an outer edge portion 45, a flat portion 50 and a slope portion 52 are formed.

The intake squish-area making portion 49, the exhaust squish-area making portion 51 and the outer edge portion 45 correspond to such first embodiment elements as the intake squish-area making portion 22, the exhaust squish-area making portion 24 and the outer edge portion 25, respectively. It is accordingly omitted to describe in detail about the intake squish-area making portion 49, the exhaust squish-area making portion 51 and the outer edge portion 45.

The flat portion 50 is a portion that is formed on the top surface 42, excepting the intake and exhausts squish-area making portions 49 and 51 and the outer edge portion 45, and is the same as the outer edge portion 45 in height.

The slope portion 52 is a slope that is formed on the top surface 42 between circumference 50A of the flat portion 50 and the outer edge portion 45 and is formed so as to slope downwards from the circumference 50A to the outer edge portion 45.

On the intake squish-area making portion 49, intake valve recesses (valve recesses) 56 are formed so that the intake valves (not shown) are prevented from interfering with the top surface 42 when the piston 11 is at TDC even if the intake valves are opened.

As shown in FIG. 4, a top land (land portion) 53, a second land 54 and a third land 55 are formed on the piston 44 corresponding to the first embodiment elements as top land 27, second land 28 and third land 29, respectively. Likewise, an intake squish-land portion 53A, an exhaust squish-land portion 53B and an outer edge land portion 53C correspond to the intake squish-land portion 27A, the exhaust squish-land portion 27B and the outer edge land portion 27C, respectively.

Detailed description of these corresponding elements in the second embodiment is therefore omitted.

Further, the cylinder head 13 is identical with the cylinder head 13 of the first embodiment shown in FIG. 1 and FIG. 3, so description is again omitted.

The operation and the effect of the present invention of the second embodiment will now be described as follows.

It is possible to more drastically reduce the height h53c of the outer edge land portion 53C of piston 41 than the height h209B of the conventional piston 201 as shown in FIG. 10. Accordingly, it is possible to reduce the quenching area, which is made between the outer edge land portion 53C and cylinder liner (not shown), in volume.

Further, when the piston 41 moves up near TDC, it is possible to be near between the intake squish-area making portion 49 and the intake squish flat portion 32, it is accordingly possible to make the intake squish-area 21. Likewise, it is possible to be near between the exhaust squish-area making portion 24 and the exhaust squish flat portion 33, it is consequently possible to make the exhaust squish-area 23.

Further, the squish currents from both of the intake squish-area 21 and the exhaust squish-area 23 to the center of chamber 43 (see arrows 'SF' in FIG. 4) are generated.

Namely, the second embodiment of the present invention can provide the following effects or/and advantages.

It is possible to reduce the amount of HC in such a manner that surly reduces both the quenching area in volume and generating of the squish currents. Consequently, improved fuel consumption and exhaust gases quality emitted from the engine 40 are both realized at the same time.

Additionally, it is possible to keep necessary rigidity by maintaining necessary metal thickness between the intake valve recesses 56 and the top ring groove 46 even if the intake valve recesses 56 are formed on the top surface 42.

Still additionally, it is possible to enable the intake valves to have longer strokes even when the piston 11 is at TDC since the intake valve recesses 56 are formed on the intake squish-area making portion 49. The power of engine 40 is increased since the efficiency of air-intake through the intake port of the engine 40 is improved.

Further additionally, it is possible to guide the exhaust gas as EGR gas into the intake port during the end period of the exhaust cycle (namely, at a time when the piston 41 is near TDC) since the engine 40 has VVT mechanism. The amount of NOx (Nitrogen Oxide) contained in exhaust gases is therefore reduced.

Still additionally, it is possible to adjust the chamber 43 in volume, which can be changed by reducing the height $h53c$ of the outer edge land portion 53C, because the circumference 50A of the flat portion 50 is formed so as to be higher than the outer edge portion 45.

Next third embodiment of the present invention will now be described with reference to the accompanying drawings.

The same reference numbers of the present embodiment as the first and second embodiments designate the same elements of the first embodiment, and the present embodiment will now be described focusing on the differences between the first and second embodiments with reference to accompanying drawings also used for the first and second embodiments.

Figure 6:
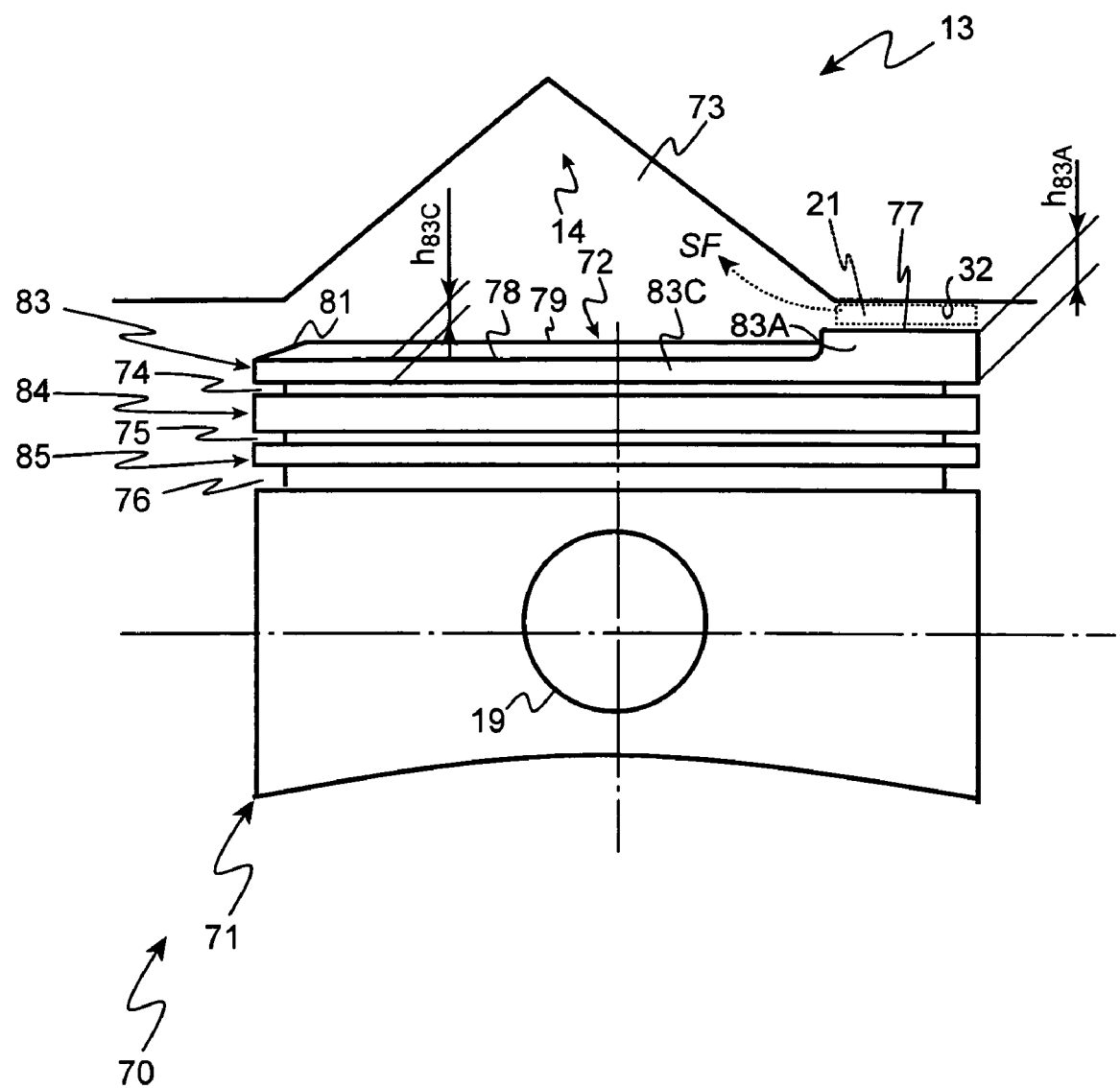
FIG. 6 is a side view showing a chamber and a piston according to a third embodiment of the present invention.

As shown in FIG. 6, a piston 71 in an engine 70 is reciprocated in a cylinder (not shown) formed in a cylinder block (not shown). And a chamber 73 is formed between the bottom surface 14 of the cylinder head 13 and a top surface 72 of the piston 71.

Around the side surface of the piston 71, a top ring groove (ring groove) 74, a second ring groove 75 and a third ring groove 76 are formed. The piston rings (not shown) individually reside within the grooves 74, 75 and 76.

The top ring groove 74 is formed near the piston top surface 72 and maintains a necessary distance from a valve recess 82.

The second ring groove 75 is formed below the top ring groove 74, and the third ring groove 76 is formed below the second ring groove 75.

On the piston top surface 72, an intake squish-area making portion (squish-area making portion) 77, an outer edge portion 78, a flat portion 79 and a slope portion 81 are formed.

The intake squish-area making portion 77, and the outer edge portion 78 correspond to such first embodiment elements as the intake squish-area making portion 22 and the outer edge portion 25, respectively. It is accordingly omitted to describe in detail about the intake squish-area making portion 77 and the outer edge portion 78.

Likewise, it is also omitted to describe in detail about the flat portion 79 and the slope portion 81 because the flat portion 79 and the slope portion 81 correspond to such second embodiment elements as the flat portion 79 and the slope portion 81, respectively.

Figure 7:
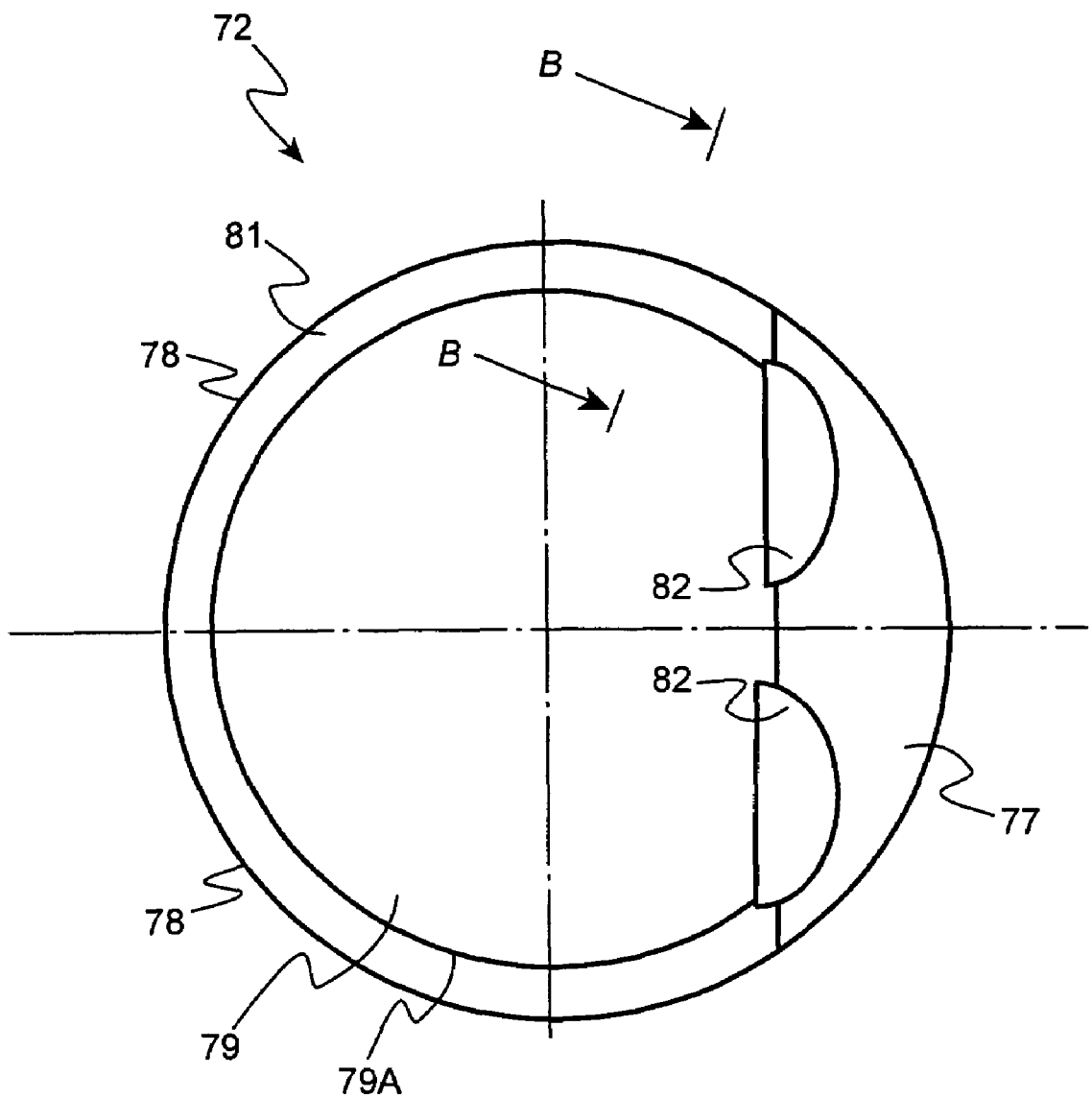
FIG. 7 is a plain view showing a top surface of the piston according to the third embodiment of the present invention.

As shown in FIG. 7, on the intake squish-area making portion 77, intake valve recesses (valve recesses) 82 are formed so that the intake valves (not shown) are prevented from hitting against the top surface 72 when the piston 71 is at TDC and the intake valves are opened.

Further, as shown in FIG. 6, atop land (land portion) 83, a second land 84 and a third land 85 are formed on the piston 71 corresponding to such first embodiment elements as the top land 27, a second land 28 and a third land 29, respectively. Likewise, an intake squish-land portion 83A and an outer edge land portion 83C correspond to the intake squish-land portion 27A and the outer edge land portion 27C.

It is therefore omitted to describe in detail about these corresponding elements of second embodiment.

Still further, the cylinder head 13 of third embodiment is identical with the cylinder head 13 of first embodiment, so further description is omitted.

The operation and the effect of the present invention of the third embodiment will now be described as follows.

It is more feasible to reduce the height $h83c$ of the outer edge land portion 83C of piston 71 than the height $h209B$ of the conventional piston 201 as shown in FIG. 10. Accordingly, it is possible to reduce the volume of the quenching area, which is between the outer edge land portion 83C and cylinder liner (not shown).

Further, when the piston 71 moves up near TDC, it is possible to be near between the intake squish-area making portion 77 and the intake squish flat portion 32, it is accordingly possible to make the intake squish-area 21.

Accordingly, generation of the squish currents from the intake squish-area 21 to the center of chamber 43 (see arrows 'SF' in FIG. 6) is realized.

Namely, the third embodiment of the present invention can provide the following effects or/and advantages.

It is possible to reduce the amount of HC in such a manner that surely reduces both the quenching area in volume and generating the squish currents. Consequently, that improved the fuel consumption and exhaust gases quality from the engine 70 are both realized at the same time.

Additionally, it is possible to maintain necessary rigidity since securing necessary metal height between the intake valve recesses 82 and the top ring groove 74 even if the intake valve recesses 82 are formed on the top surface 72.

Still additionally, it is possible to enable the intake valves to have longer strokes even when the piston 71 is at TDC since the intake valve recesses 82 are formed on the intake squish-area making portion 77. The power of engine 70 is thereby increased since the efficiency of air-intake through the intake port the engine 70 is improved.

Further additionally, it is possible to guide the EGR gas into the intake port during the end period of the exhaust cycle (namely, at a time when the piston 71 is near TDC) since the engine 70 is equipped with the VVT mechanism. The amount of NOx (Nitrogen Oxide) contained in exhaust gases is therefore reduced.

Moreover, it is possible to adjust the engine's compression rate, which is varies as the height $h83c$ of the top land portion 83 is reduced, by causing the circumference 79A of the flat portion 79 so as to be higher than the outer edge portion 78.

As described above, the present invention is not limited to the above embodiments, but the present invention covers all changes and modifications which do not constitute departures from the spirit and scope of the invention.

Figure 8A:
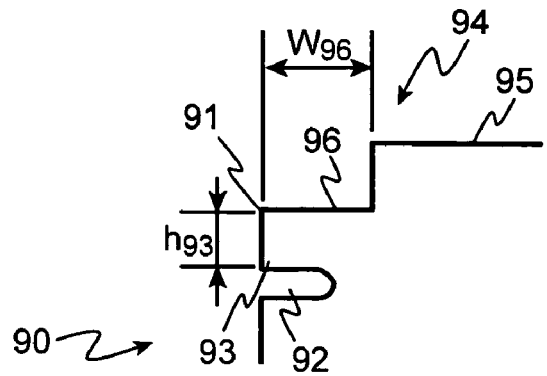
FIG. 8A, FIG. 8B and FIG. 8C are cross-sectional views individually showing a top edge of the piston of modifications to the first and second embodiments of the present invention.
Figure 8B:
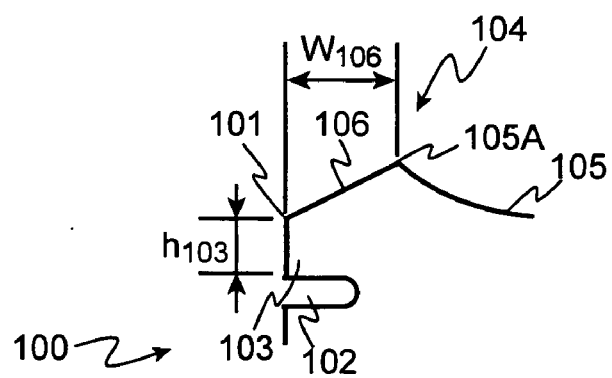

For example, it is acceptable to form the edge of pistons as shown in FIGS. 8A and 8B each showing the cross-sectional view 'B-B' in FIG. 7.

Namely, a piston 90 shown in FIG. 8A has a stepped portion 96 so that a distance from an outer edge 91 of the piston 90 to a top ring groove 92 is reduced. In other words, it is possible to reduce the height of a top land (land portion) 93 according to the structure of piston 90.

The stepped portion 96 is formed between the outer edge 91 and a flat portion 95 on the top surface 94 of the piston 90 with width W96. And the stepped portion 96 is formed to be the same height as the outer edge portion 91. It is therefore possible to improve the quality of exhaust gas.

On the other hand, as shown in FIG. 8B, it is acceptable to reduce height h103, which is the same as a height of top land 103, between a top ring groove 102 and an outer edge 101 formed circumference of the piston 101.

Further, on a top surface 104 of the piston 100, a dent portion 105 and a slope portion (slope surface) 106, between the outer edge 101 and a circumference 105A of dent portion 105, are formed. The circumference 105A is higher than the outer edge 101.

As described above, it is possible to enhance the stability of air-fuel mixture since promoting the mixing of air and fuel in the chamber since forming the dent portion 105 on the top surface 104.

Moreover, it is possible to precisely adjust the necessary compression rate of the engine 100, which is changed due to reducing the height h103 of the top land portion 103, since forming the circumference 105A of the dent portion 105 so as to be higher than the outer edge portion 101 so that the volume of the quenching area is reduced.

Figure 8C:
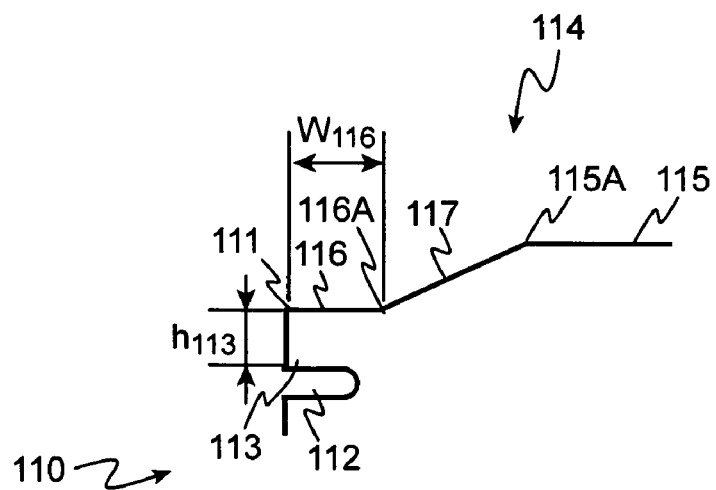
Figure 9:
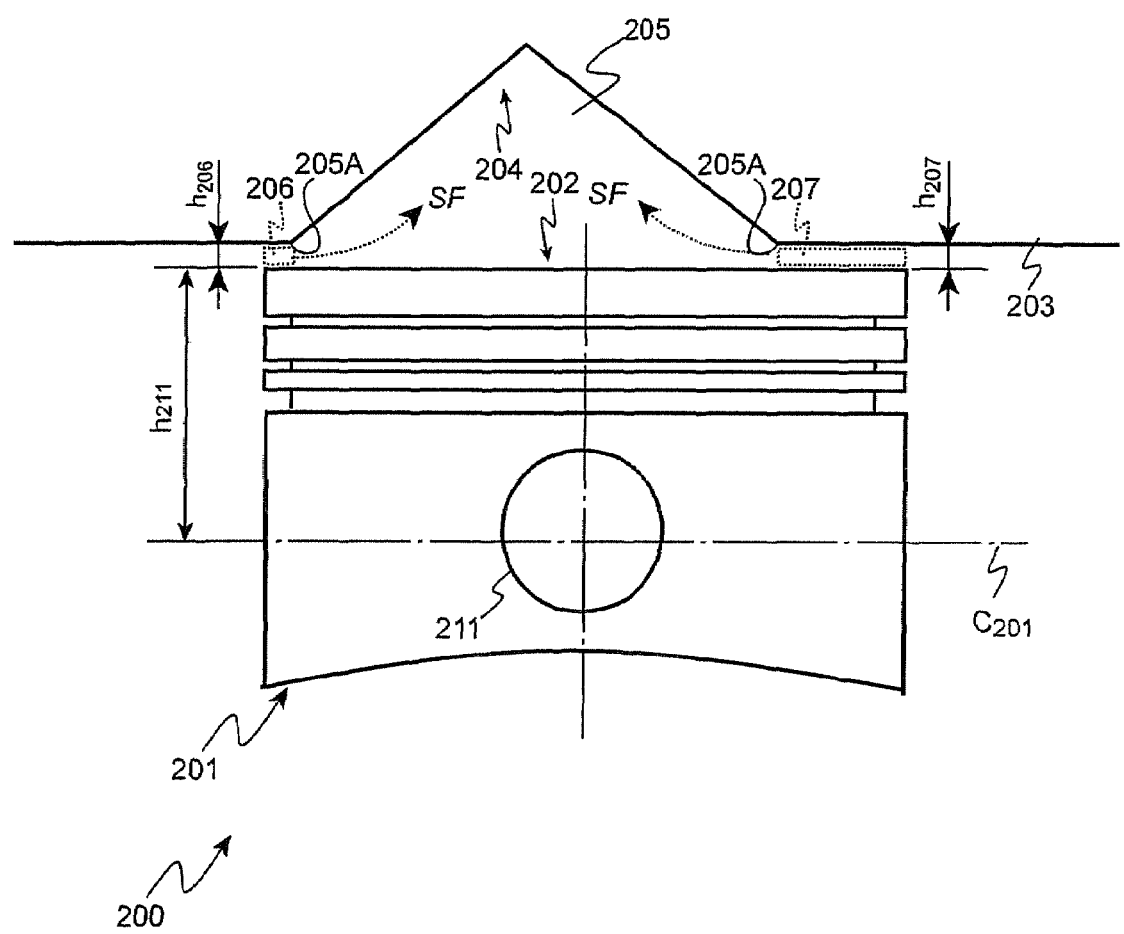
FIG. 9 is a side view showing a conventional chamber and a conventional piston.

On the other hand, as shown in FIG. 8C, it is acceptable to reduce a height h113, which is the same as a height of top land 113, between a top ring groove 112 and an outer edge 111 formed circumference of a piston 110.

Further, on a top surface 114 of the piston 110, a flat portion 115, a stepped portion 116, which is a portion between the outer edge 111 and the flat portion 115 on the top surface 114, and a slope portion 117, which is a portion between an inner circumference 116A and an outer circumference 115A of the flat portion 105. The flat portion 115 is higher than the outer edge 111. The width of stepped portion 116 is W116 shown in FIG. 8C.

As described above, it is possible to adjust the engine's compression rate by forming the flat portion 115 swelled on the top surface 114. And it is possible to enhance the quality of exhaust gas because of reducing the volume of the quenching area since reducing the height h113 of top land 113.

What is claimed is:

1. A structure of a chamber in a combustion engine, comprising:
    a cylinder block of the engine having a cylinder in which a piston is reciprocatably disposed;
    a cylinder head of the engine disposed on the cylinder block;
    a chamber formed between a bottom surface of the cylinder head and a top surface of the piston;
    an intake port formed in the cylinder head for inducting air to the chamber;
    an exhaust port formed in the cylinder head for discharging exhaust gas from the chamber;
    an intake valve for selectably closing the intake port;
    an exhaust valve for selectably closing the exhaust port;
    a ring-groove portion, in which a piston ring is fitted, formed around a side-outer surface of the piston;
    a squish-area making portion, which is formed on the top surface and outer edge of the piston, for making narrow space as a squish-area defined between the bottom surface of the cylinder head and the top surface of the piston located in top dead center;
    a flat portion which is a flat surface formed on the top surface of the piston except said squish-area making portion;
    an outer edge portion formed around the top surface of the piston except said squish-area making portion; and
    a land portion, which is formed around a side surface of the piston between said ring-groove portion and the top surface of the piston, said land portion having
        a squish-land portion formed between said ring-groove portion and said squish-area making portion, and
        an outer edge land portion which extends continuously from the squish-land portion and is formed between said ring-groove portion and said outer edge portion
    wherein a height from said ring-groove portion to said squish-area making portion is larger than a height from said ring-groove portion to said outer edge portion, and
    wherein said flat portion is higher than said outer edge portion in height.

2. A structure of a chamber in a combustion engine, comprising:
    a cylinder block of the engine having a cylinder in which a piston is reciprocatably disposed;
    a cylinder head of the engine disposed on the cylinder block;
    a chamber formed between a bottom surface of the cylinder head and a top surface of the piston;
    an intake port formed in the cylinder head for inducting air to the chamber;
    an exhaust port formed in the cylinder head for discharging exhaust gas from the chamber;
    an intake valve for selectably closing the intake port;
    an exhaust valve for selectably closing the exhaust port;
    a ring-groove portion, in which a piston ring is fitted, formed around a side-outer surface of the piston;
    a squish-area making portion, which is formed on the top surface and outer edge of the piston, for making narrow space as a squish-area defined between the bottom surface of the cylinder head and the top surface of the piston located in top dead center;
    a flat portion which is a flat surface formed on the top surface of the piston except said squish-area making portion;
    a valve recess formed on said squish-area making portion to avoid interfere between said squish-area making portion and at least one of the intake valve and the exhaust valve;
    an outer edge portion formed around the top surface of the piston except said squish-area making portion; and
    a land portion, which is formed around a side surface of the piston between said ring-groove portion and the top surface of the piston, said land portion having
        a squish-land portion formed between said ring-groove portion and said squish-area making portion, and
        an outer edge land portion which extends continuously from the squish-land portion and is formed between said ring-groove portion and said outer edge portion
    wherein a height from said ring-groove portion to said squish-area making portion is larger than a height from said ring-groove portion to said outer edge portion, and
    wherein said flat portion is higher than said outer edge portion in height.

3. A structure of a chamber in a combustion engine according to claim 2, wherein
    said valve recess is an intake valve recess to avoid interference between said squish-area making portion and the intake valve.

* * * * *